(12) United States Patent
Iimura et al.

(10) Patent No.: US 6,284,424 B1
(45) Date of Patent: Sep. 4, 2001

(54) ELECTROPHOTOGRAPHIC TONER AND IMAGE FORMING METHOD AND APPARATUS USING THE TONER

(75) Inventors: Haruo Iimura, Yokohama; Takeo Yamaguchi, Tokyo, both of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/534,396

(22) Filed: Mar. 24, 2000

(30) Foreign Application Priority Data

Mar. 25, 1999 (JP) .................................................. 11-081627

(51) Int. Cl.⁷ ..................................................... G03G 9/097
(52) U.S. Cl. .......................... 430/110; 430/111; 430/126; 399/297
(58) Field of Search .................................. 430/106, 109, 430/110, 111, 120, 126; 399/297

(56) References Cited

U.S. PATENT DOCUMENTS 5,422,214 * 6/1995 Akiyama et al. ..................... 430/111
6,060,202 * 5/2000 Ogawa et al. ........................ 430/111

OTHER PUBLICATIONS

Japan Patent Publication No. 01–112253, Apr. 1989 (English Abstract only).
Japan Patent Publication No. 02–284158, Nov. 1990 (English Abstract only).
Japan Patent Publication No. 03–181952, Aug. 1991 (English Abstract only).
Japan Patent Publication No. 04–162048, Jun. 1992 (English Abstract only).
Japan Patent Publication No. 04–110861, Apr. 1992 (English Abstract only).
Japan Patent Publication No. 05–134455, May 1993 (English Abstract only).
Japan Patent Publication No. 05–333757, Dec. 1993 (English Abstract only).
Japan Patent Publication No. 06–167825, Jun. 1994 (English Abstract only).
Japan Patent Publication No. 06–167826, Jun. 1994 (English Abstract only).
Japan Patent Publication No. 06–273978, Sep. 1994 (English Abstract only).
Japan Patent Publication No. 07–333890, Dec. 1995 (English Abstract only).
Japan Patent Publication No. 08–305075, Nov. 1996 (English Abstract only).

* cited by examiner

*Primary Examiner*—John Goodrow
(74) *Attorney, Agent, or Firm*—Oblon, Spivak, McClelland, Maier & Neustadt, P.C.

(57) ABSTRACT

A toner for developing an electrostatic latent image on a photoreceptor, wherein the toner includes particles, and wherein the particles of the toner having particle diameters within a range of D±d and measured in $\mu m$, wherein $d \leq 2$ $\mu m$, have an average non-electrostatic adhesion force Fne (D) and measured in nN against the photoreceptor, and wherein a proportional factor K of a primary regression line of a diagram in which the toner particle diameter D is plotted on the horizontal axis and the non-electrostatic adhesion force Fne(D) is plotted on the vertical axis, is from 0.01 $nN/\mu m$ to 5 $nN/\mu m$.

19 Claims, 5 Drawing Sheets

ELECTROPHOTOGRAPHIC TONER AND IMAGE FORMING METHOD AND APPARATUS USING THE TONER

BACKGROUND OF THE INVENTION

1. Field of the Invention

The present invention relates to an electrophotographic toner useful for one-component or two-component developers. In addition, the present invention relates to an image forming method and apparatus, such as copiers, printers and facsimile machines, using the toner.

2. Discussion of the Background

At the present day, various electrophotographic image forming methods are known. The methods typically include the following processes:

(1) the surface of an image bearing member (a photoreceptor) is charged (charging process); n(2) the image bearing member (photoreceptor) is exposed to light to form an electrostatic latent image thereon (latent image forming process);

(3) the latent image is developed with an electrophotographic toner to form a toner image on the image bearing member (developing process);

(4) the toner image is transferred onto a receiving material (transferring process); and (5) the toner image on the receiving material is fixed upon application of heat or pressure, or combination thereof (fixing process).

Thus, a document having a fixed image is provided. The toner remaining on the image bearing member even after the toner image is transferred on the receiving material is removed by a known cleaning method using a blade, brush, roller or the like.

Digital image formation and high quality image formation are the recent trends of the electrophotography. With respect to resolution of images, it is needed and investigated to form an image having high resolution of not less than 1200 dpi (dot per inch). In order to prepare images having such high resolution, a toner having a relatively small particle diameter is needed. For example, Japanese Laid-Open Patent Publications Nos. 1-112253, 2-284158, 3-181952 and 4-162048 have proposed toners having a small particle diameter and a specified particle diameter distribution.

In the toners having a small particle diameter, the adhesion force of a toner particle to other toner particles or members (photoconductor etc.) of an image forming apparatus cannot be neglected. This adhesion force influences almost all the image forming processes in an image forming apparatus, and thereby the image qualities are influenced. In particular, the adhesion force causes background development in the developing process. In addition, the adhesion force causes hollow defects and scattered toner images generated in the transferring process. Further, the adhesion force causes background fouling due to toner particles remaining on the photoreceptor after the cleaning process. When a toner having a relatively small particle diameter is used, these phenomena are furthered. Therefore, when designing a toner, it is an important subject how to control the adhesion force of the particles of the toner.

For example, in a developing process using a two component developer, at first a large amount of toner particles contact (or adhere to) the surface of a photoreceptor in a developing nip. The toner particles adhere to the photoreceptor (i.e., the toner is used for developing) or return to (i.e., are scavenged by) the carrier particles depending on the direction and quantity of Coulomb force due to the developing determined depending on the charge quantity of the toner particles. However, the charge quantity of the toner particles has a distribution, and therefore the behaviors of toner particles are different depending on their charge quantity.

In general, a developing bias is applied to a developing nip to avoid the background development of images. The toner particles, which are present in the background area of the photoreceptor in the developing nip and which are normally charged, are scavenged by the carrier particles due to large Coulomb force formed in the developing nip, and thereby occurrence of background development can be avoided. However, a small amount of toner particles having an opposite charge are present in a toner. These toner particles receive Coulomb force such that the toner particles adhere to the photoreceptor, and thereby background development occurs. In addition, toner particles having a relatively low charge quantity, the Coulomb force formed toward the carrier particles is low. Therefore the toner particles tend not to be scavenged by the carrier particles, and tend to remain on the photoconductor.

Thus, the reason of background development is considered to be that the toner particles having an opposite charge or a relatively low charge quantity included in toner particles adhere to the background area. The toner particles having such an abnormal charge are formed when a toner and a carrier are insufficiently mixed and stirred. In addition, the toner particles having such an abnormal charge increase when the toner is used for a long period of time.

In attempting to solve this problem (i.e., to reduce the toner particles having such an abnormal charge), a technique that a toner having a specified charge distribution is used is disclosed in Japanese Laid-Open Patent Publication No. 4-110861. However, when a toner having a relatively small particle diameter or a toner having a relatively low softening point which is used for low heat energy fixing is used, the background development problem cannot be solved by such a technique. Therefore, it is important to control the adhesion force of toner.

In the transferring process, toner particles on a photoreceptor are transferred onto a receiving material due to an electrostatic field formed in the transferring area. The toner transfer depends on the amount of the adhesion force of the toner and the amount of the electrostatic field. Therefore, it is important to control the adhesion force of toner. When the toner transfer is performed using a roller or a belt, the toner images on a photoreceptor are pressed toward the photoreceptor. Therefore, the toner particles of the images tend to gather on the surface of the photoreceptor, resulting in increase of adhesion force between the toner particles and the photoreceptor, and increase of adhesion force among the toner particles. Therefore, the toner tends to remain on the photoreceptor. This phenomenon tends to particularly occur in center parts of line images, resulting in occurrence of hollow defects. Accordingly, it is needed to control the adhesion force between the toner particles and the photoreceptor, and the adhesion among the toner particles. Alternatively, the pressure applied to the toner may be decreased.

The adhesion force between the toner particles and the photoreceptor is classified into an electrostatic adhesion force depending on the charge quantity of the toner particles and a non-electrostatic adhesion force. When the charge quantity of toner particles is decreased, the electrostatic adhesion force can be decreased. However, the charge quantity of toner particles is too low, a problem which occurs is that toner images cannot be transferred by the electrostatic filed formed in the transferring area.

The adhesion force has been discussed in Japanese Laid-Open Patent Publications Nos. 5-333757, 6-167825, and 6-167826. However, the non-electrostatic adhesion force is not discussed therein. In Japanese Laid-Open Patent Publication No. 8-305075, the non-electrostatic adhesion force among toner particles is discussed, however the relationship between image qualities and non-electrostatic adhesion force of toner particles to members in an image forming apparatus is not discussed.

The adhesion force among toner particles or between toner particles and members in an image forming apparatus has a distribution. When the distribution is broad (i.e., there are toner particles having too large adhesion force or too small adhesion force), image defects tend to be produced. Therefore, toner having adhesion force whose distribution is sharp is preferable. Since the adhesion force of toner particles generally depends on the particle diameter, a toner having a particle diameter whose distribution is sharp is needed to obtain a toner having an adhesion force whose distribution is sharp. In order to prepare a toner having a particle diameter whose distribution is sharp, the particle diameter of toner particles is severely controlled in the pulverization process and/or the classification process when the toner is manufactured. In attempting to prepare such a toner having a particle diameter whose distribution is sharp, Japanese Laid-Open Patent Publications Nos. 5-134455, 6-273978 and 7-333890 disclose toner manufacturing techniques. Since the classification of toner particles is severely performed in these techniques, a large amount of toner particles, whose particle diameter is outside the desired range, are disposed of, resulting in serious increase of manufacturing costs. In addition, these techniques are not preferable in the viewpoint of environmental protection.

Because of these reasons, a need exists for a toner which has adhesion force whose distribution is sharp and which is easily and efficiently manufactured.

SUMMARY OF THE INVENTION

Accordingly, an object of the present invention is to provide an electrophotographic toner which can produce images having good image qualities and which can be easily and efficiently manufactured without performing a severe classification operation.

Another object of the present invention is to provide an electrophotographic image forming method and apparatus which use the toner mentioned above and which can produce images having good image qualities.

Briefly these objects and other objects of the present invention as hereinafter will become more readily apparent can be attained by a toner for developing an electrostatic latent image on a photoreceptor, wherein the toner includes toner particles, and wherein the toner particles having particle diameters within a range of D±d and measured in $\mu$m, wherein $d \leq 2$ $\mu$m, have an average non-electrostatic adhesion force Fne(D) and measured in nN against the photoreceptor, and wherein a slope of a primary regression line of a diagram in which the toner particle diameter D is plotted on the horizontal axis and the non-electrostatic adhesion force Fne(D) is plotted on the vertical axis, is from 0.01 nN/$\mu$m to 5 nN/$\mu$m.

The non-electrostatic adhesion force is measured by a centrifugal separation method.

The distribution of the non-electrostatic adhesion force of the toner in common logarithm scale preferably has a standard deviation of not greater than 0.65.

The toner of the present invention preferably includes an external additive having an average particle diameter of from 1 nm to 100 nm, and 8% to 100% of the surface area of the toner particles are preferably covered by the external additive.

In another aspect of the present invention, an image forming method is provided which includes the steps of forming an electrostatic latent image on a photoreceptor, developing the latent image with the toner mentioned above to form a toner image, and transferring the toner image onto a receiving material.

In yet another aspect of the present invention, an image forming apparatus is provided which includes an image bearing member, a latent image forming device which forms an electrostatic latent image on the image bearing member, a developing device which develops the electrostatic latent image with the toner mentioned above to form a toner image on the image bearing member, and a transferring device which transfers the toner image to a receiving material.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

At first the method for measuring adhesion force between a toner and a photoreceptor using a centrifugal separation method. When the adhesion force of a toner is measured, it is generally performed to measure the force needed to separate the toner from a material to which the toner adheres. The method for separating the toner from the material includes methods utilizing centrifugal force, vibration, impact, air pressure, electric field, magnetic field, etc. Among these methods, methods utilizing centrifugal force are preferable because adhesion force can be easily and precisely measured. Therefore, one of the methods is used in the present invention.

Hereinafter the method utilizing centrifugal force will be explained. Methods utilizing centrifugal force are described, for example, in IS&T NIP7th p.200(1991).

Figure 1:
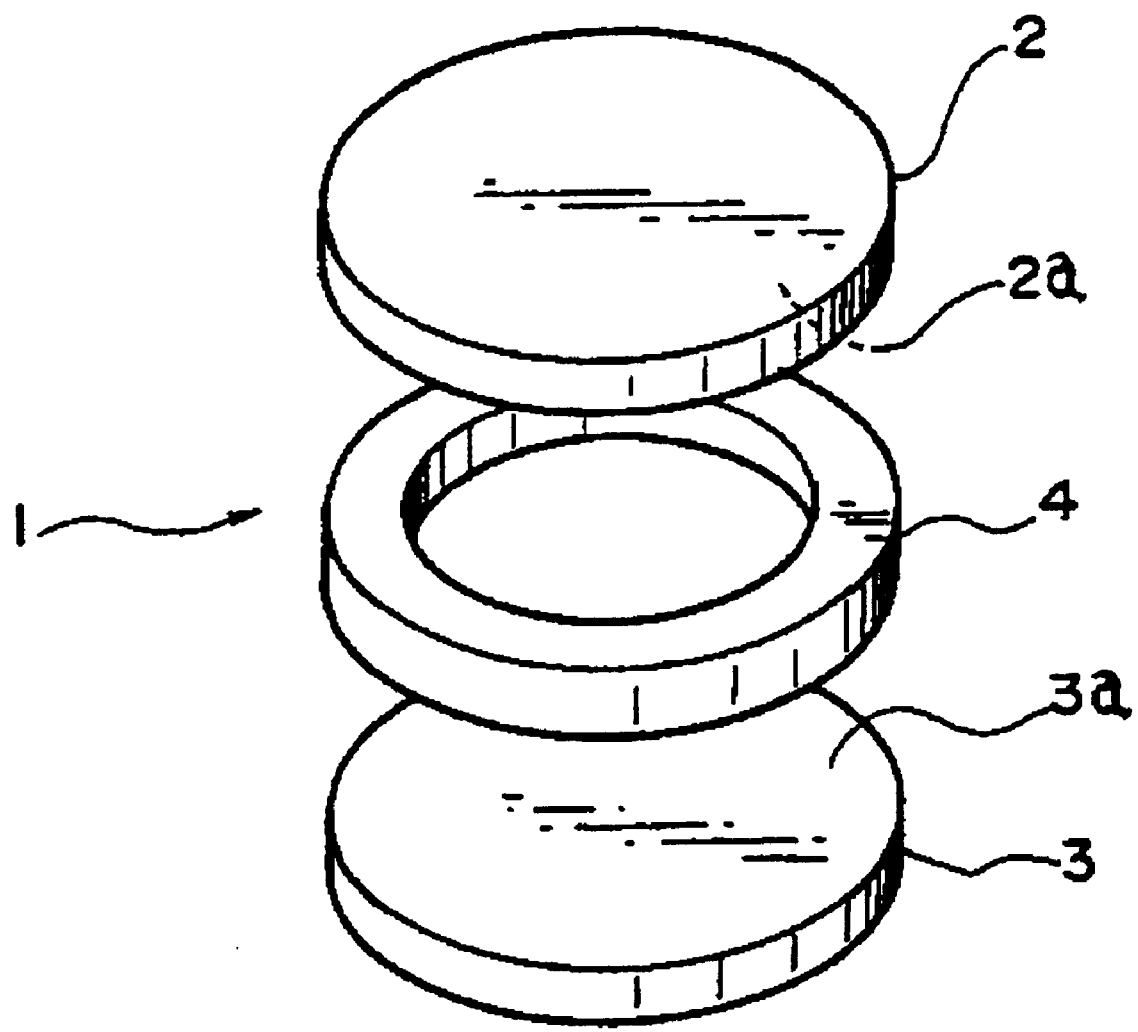
FIG. 1 is a schematic view illustrating a cell used for measuring the adhesion force of a powder.
Figure 2:
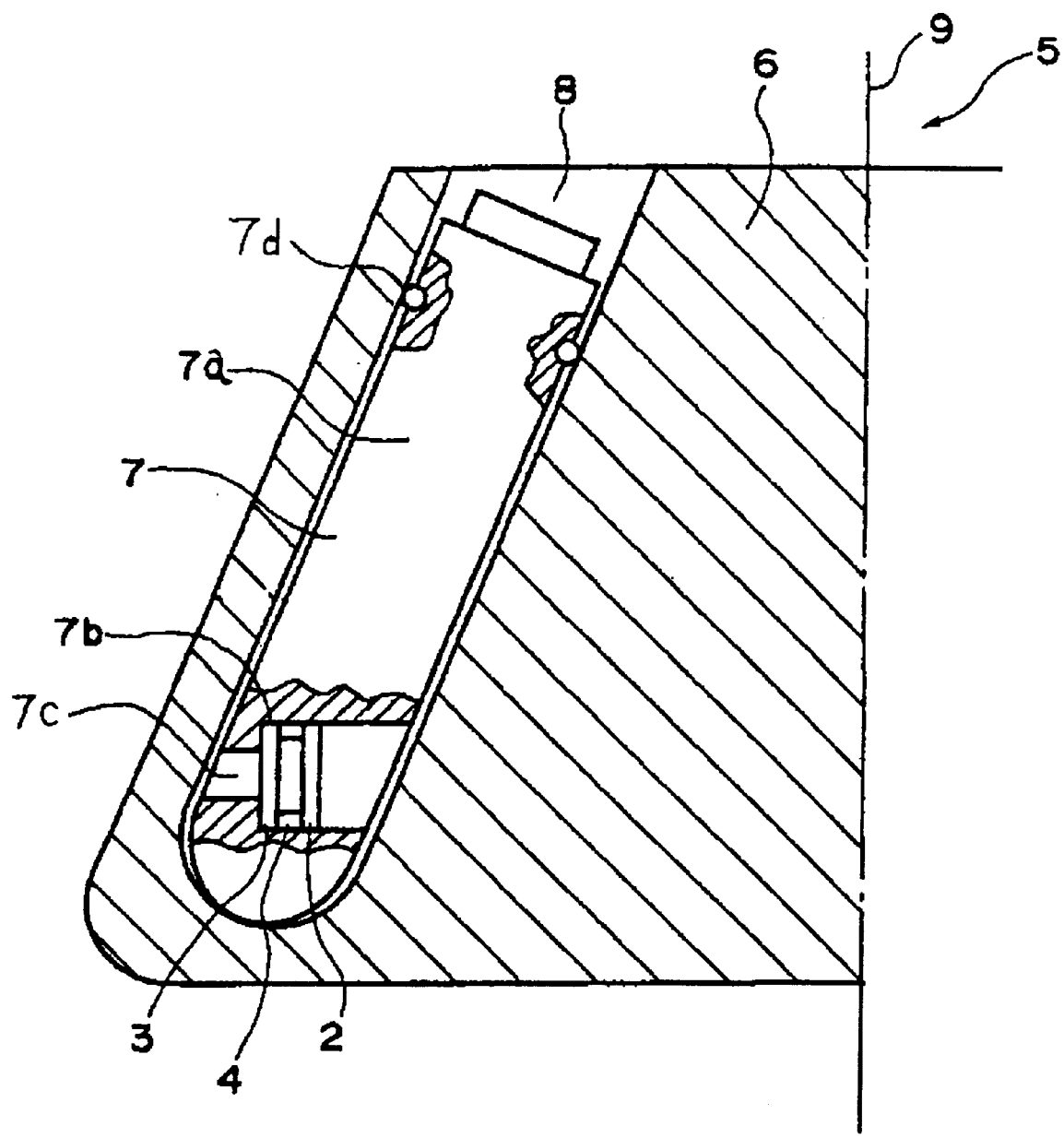
FIG. 2 is a side view partly in section illustrating a centrifuge used for measuring the adhesion force of a powder.

FIGS. 1 and 2 are schematic views illustrating a measuring cell and a centrifugal separation apparatus, respectively, which are useful for measuring adhesion force utilizing centrifugal force. In FIG. 1, a cell 1 includes a substrate 2 having a surface 2a on which a toner is to be adhered, a receiving plate 3 having an surface 3a, and a spacer 4 which is to be arranged between the surface 2a and the surface 3a.

In FIG. 2, a centrifuge 5 includes a rotor 6 which rotates the cell 1, and a sample holder 7. The rotor 6 has a hole 8 in which the sample holder 7 is contained. The sample holder 7 has a cylinder 7a, a cell supporter 7b which is provided on the cylinder 7a, a hole 7c which is used for extruding the cell 1, and a fixing element 7d which fixes the cylinder 7a in the hole 8. The cell supporter 7b is arranged so that the cell 1 is set perpendicularly to a rotation axis 9 when the cylinder 7a is set in the hole 8.

The method for measuring the non-electrostatic adhesion force of a toner using to the measuring apparatus mentioned above will be explained in detail.

A photoreceptor is directly formed on the substrate 2, or a photoreceptor sheet is set on the substrate 2 with an adhesive. Then a toner which is not charged is adhered on the photoreceptor (i.e., the surface 2a). The cell 1 is assembled using the substrate 2 on which the non-charged toner is adhered, the receiving plate 3 and the spacer 4. The cell 1 is set in a cell supporter 7b such that when the sample holder 7 is set in the hole 8, the substrate 2 is positioned between the receiving plate 3 and the rotation axis 9. In addition, the cell 1 is set so that the vertical direction of the cell 1 is perpendicular to the rotation axis 9. The centrifuge 5 is operated to rotate the rotor 6 at a predetermined rotation speed. The toner adhered on the substrate 2 receives a centrifugal force depending on the rotation speed. When the centrifugal force is greater than the adhesion force between the toner and the surface 2a (i.e., the surface of the photoreceptor), the toner is separated from the surface 2a and adheres on the surface 3a.

The centrifugal force F which the toner receives can be obtained by the following equation (1):

$$F = m \times r \times (2\pi f/60)^2 \quad (1)$$

wherein m represents the weight of a particle of the toner, f represents the rotation speed of the rotor (unit: rpm), and r represents the distance between the rotation axis 9 of the rotor and the toner (i.e., the surface 2a).

The weight of the toner particle is obtained by the following equation:

$$m = (\pi/6) \times \rho \times d^3 \quad (2)$$

wherein ρ represents the true specific gravity of the toner particle, d represents the diameter of the toner particle when the toner particle is considered to be a sphere.

Therefore equation (1) is changed to the following equation (3):

$$F = (\pi^3/5400) \times \rho \times d^3 \times r \times f^2 \quad (3)$$

After the centrifugal separation operation, the sample holder 7 is taken out of the hole 8, and the cell 1 is taken out of the cell supporter 7b. The receiving plate 3 is changed to another receiving plate 3. The cell 1 is reset in the cell supporter 7b and then the sample holder 7 is reset in the hole 8. The separation operation is then performed at a higher rotation speed. The centrifugal force which the toner receives is higher than that in the last separation operation, and the toner particles having a relatively large adhesion force are separated from the surface 2a and adheres on the surface 3a of the another receiving plate 3. Thus, the centrifugal separation operation is repeated so that the rotation speed is higher than that in the last separation operation.

After all the centrifugal separation operations, the particle diameter of each of the toner particles adhered on the respective surfaces 3a of the plurality of receiving plates 3 is measured, and then the adhesion force of each of the toner particles is obtained using equation (3).

The particle diameter and particle number are obtained as follows:

(1) observing the toner particles on the surface 3a using an optical microscope;
(2) the image is input to an image processing apparatus using a CCD camera; and
(3) the image is processed to determine the particle diameter and the number of the toner particles on the surface 3a.

Figure 3:
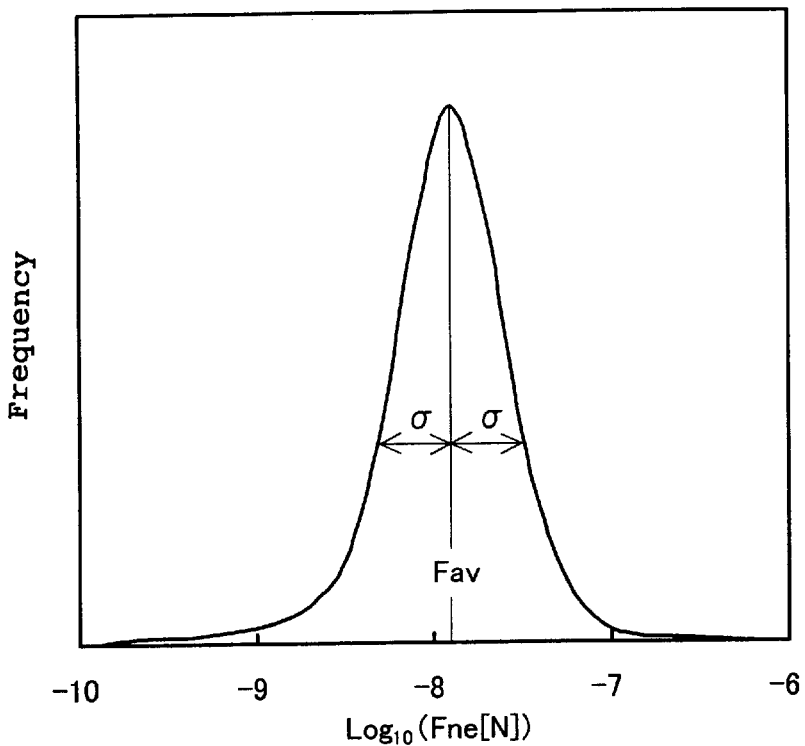
FIG. 3 is a graph illustrating an example of the distribution of non-electrostatic adhesion force between toner particles and a photoreceptor.

FIG. 3 is a graph illustrating an example of the distribution curve of non-electrostatic adhesion force Fne represented by common logarithm between toner particles and a photoreceptor, which is obtained by the method mentioned above. As shown in FIG. 3, the non-electrostatic adhesion force distribution curve is characterized by the average value Fav and the standard deviation σ. The average value Fav and the standard deviation σ change depending on the factors such as average particle diameter, particle diameter distribution, shape, constitutional materials, and additives of the toner.

Figure 4:
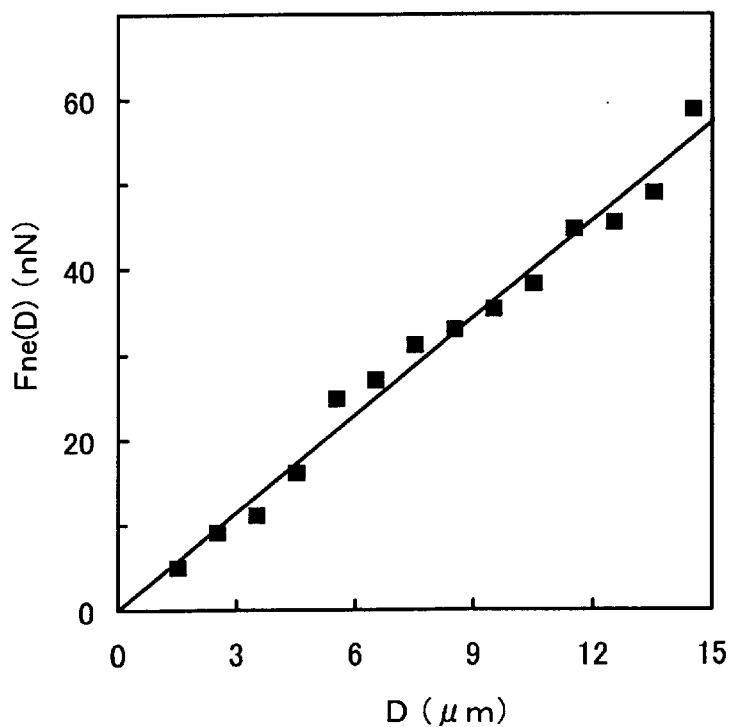
FIG. 4 is a graph illustrating an example of the relationship between the diameter D of a toner and the non-electrostatic adhesion force Fne(D) between the toner and a photoreceptor.

After performing all centrifugal separation operations, in which the rotation speed is changed from low speed to high speed, the particle diameter of each of the toner particles on the respective surfaces 3a to obtain the adhesion force thereof. Then the average value of the non-electrostatic adhesion force Fne(D) of the group of the toner particles having a particle diameter D is obtained. Thus, the relationship between Fne (D) and D can be obtained. Namely, by making a D–Fne (D) plot with respect to the plurality of centrifugal separation operations, such a graph as shown in FIG. 4 can be obtained. At this point, Fne(D) is obtained as follows:

(1) An arithmetical average value A of the non-electrostatic adhesion forces, which are represented by common logarithm, of the toner particles whose particle diameters are in a range of D±0.5 μm is obtained; and
(2) The average non-electrostatic adhesion force Fne(D) is obtained by the equation, Fne(D)=$10^A$.

As can be understood from FIG. 4, the non-electrostatic adhesion force Fne(D) is proportional to the particle diameter D. The line in FIG. 4 is a primary regression line of the measured values. The slope of the line (i.e., the proportionality factor) is K. Even when toners are prepared using the same materials, the average non-electrostatic adhesion force of the toners are different if the toners have different average particle diameters or particle diameter distributions.

Even when the particle number in a group of the toner particles having a particle diameter D changes, the average non-electrostatic adhesion force Fne(D) does not change. This is because when an average value is obtained from N samples, the average value does not depend on the number of the samples if N is sufficiently large. Therefore, the proportionality factor K of a toner does not depend on the average particle diameter and particle diameter distribution of the toner. Therefore, the adhesion forces of different toners can be compared using the proportionality factor K thereof without considering their average particle diameters and particle diameter distributions. When the particle diameter range, D±d ($\mu$m), is too large, the average non-electrostatic adhesion force Fne(D) changes depending on the particle distribution. Therefore, it is preferable that d is not greater than 2 $\mu$m.

The present inventors prepared various toners and measured the non-electrostatic adhesion forces thereof. As a result of investigation of the relation between the image qualities and the proportionality factor K and the standard deviation $\sigma$, it is discovered that by using toners having a proportionality factor K of from 0.01 (nN/$\mu$m) to 5 (nN/$\mu$m), images having good image qualities without background development and hollow defects can be obtained. When the proportionality factor K is too large, the toner has a large non-electrostatic adhesion force, and therefore, background development and hollow defects tend to occur. When the proportionality factor is too small, the toner has a small non-electrostatic adhesion force, and therefore, image defects such as scattered toner images (i.e., a problem in that when toner images are transferred, the toner particles are scattered around the toner images) tend to occur.

In addition, it is discovered that by using toners having a standard deviation $\sigma$ of not greater than 0.65, images having good image qualities without background development and hollow defects can be obtained. When the standard deviation $\sigma$ is too large, the toner has a broad non-electrostatic adhesion force distribution. Namely, since the toner includes toner particles having too large and/or too small adhesion force, the resultant toner images tend to have image defects.

The non-electrostatic adhesion force between a toner and a photoreceptor includes van der Waals force, capillary force and other intermolecular forces. These forces change depending on the shape of the contact area of the toner with the photoreceptor. In particular, the radius of curvature of the contact area largely influences the non-electrostatic adhesion force and is an important factor. When the surface of mother particles (i.e., toner particles before an external additive is added thereto) of a toner are covered with an external additive, the radius of curvature of the surface of the toner is largely changed, and therefore it is effective for controlling the non-electrostatic adhesion force of the toner.

The present inventors examined the proportionality factor K of various toners. As a result thereof, it is discovered that the proportionality factor K depends on the constitutional materials and shape of a toner. In particular, the proportionality factor K largely depends on the covering rate of the surface of a toner with an external additive. The covering rate is defined as the ratio of the area of the external additive adhered on a toner particle to the surface area of the toner particle. The covering rate of a toner can be determined by analyzing the microscopic picture of toner particles obtained using an electron microscope. The present inventors discover that:

(1) when the covering rate increases, the proportionality factor K decreases, and when the covering rate is greater than a certain value, the proportionality factor K becomes almost a constant value; and (2) the dependency of the proportionality factor K on the covering rate changes depending on the shape of the toner, and the particle diameter and species of the external additive used.

In other words, the covering rate of a toner needed for obtaining a proportionality factor K of from 0.01 nN/$\mu$m to 5 nN/$\mu$m changes depending on the shape of the toner, and the particle diameter and the species of the external additive used.

In addition, the present inventors examined the relationship between the covering rate and the standard deviation $\sigma$. As a result thereof, it is discovered that the standard deviation $\sigma$ largely depends on the covering rate.

Therefore it is discovered that the adhesion force distribution can be controlled by the covering rate of a toner as well as by the particle diameter distribution of the toner. When the covering rate increases, the standard deviation $\sigma$ decreases, the dependency of the standard deviation $\sigma$ of the adhesion force of a toner on the covering rate changes depending on the shape of the toner, and the particle diameter and the species of the external additive used. In other words, the covering rate of a toner needed for obtaining a standard deviation $\sigma$ of not greater than 0.65 can be achieved by properly selecting the shape of the toner, and the particle diameter and the species of the external additive used.

The present inventors discovers that a toner having a proportionality factor K of from 0.01 nN/$\mu$m to 5 nN/um and a standard deviation of not greater than 0.65 can be obtained by covering mother toner particles with an external additive, whose primary particles have an average particle diameter of from 1 nm to 100 nm and preferably from 5 nm to 80 nm, at a covering rate of from 8% to 100% and preferably from 10% to 90%.

When the average particle diameter of the primary particles of an external additive is too small, the external additive can produce no effects because the external additive is buried in the mother particles. When the average particle diameter of the primary particles of an external additive is too large, the external additive tends to release from the mother particles, and the constitutional elements of an image forming apparatus, such as a photoreceptor etc., tend to be damaged by the free external additive particles.

When the covering rate is too small, it is hard to prepare a toner having a proportionality factor K of not greater than 5 nm/$\mu$m. In addition, it is hard to prepare a toner having a standard deviation $\sigma$ of not greater than 0.65 if the toner has a broad particle diameter distribution. When the covering rate is too large, the external additive tends to release from the mother particles, and the constitutional elements of an image forming apparatus, such as a photoreceptor etc., tend to be damaged by the free external additive particles.

The covering rate of a toner depends on various factors such as the concentration, particle diameter and specific gravity of the external additive; the particle diameter, specific gravity and shape of the toner particles; and addition method of the external additive. For example, when the concentration of an external additive is too small, a toner having a covering rate of not less than 8% cannot be obtained. On the contrary, when the concentration of an external additive is too large, free particles of the external additive increase, and thereby the institutional elements tend to be damaged.

The area of the surface of mother toner particles, on which particles of an external additive are present, is proportional to the occupation area of a particle of the external additive (i.e., the area of a surface portion of a mother toner particle occupied by a particle of an external additive) and the number of the external additive particles present on the surface of the mother toner particles. When the weight of the added external additive is constant, the covering rate is large if the additive has a small diameter. Therefore, an external additive having a relatively small diameter is used, the covering rate can be achieved in a relatively low concentration.

In addition, when the concentration of an external additive is constant, the covering rate decreases when the mother toner particles have a relatively small diameter because the mother toner particles have relatively large surface area. Further, when the mother toner particles have the same particle diameter, mother toner particles having an irregular shape have a relatively large surface area. Therefore, when the mother toner particles have an irregular shape, the covering rate is relatively small compared to the case that the mother toner particles have a spherical shape even when the concentration of an external additive is constant.

When an external additive is added to mother toner particles, the external additive tends to adhere to the mother particles while the external additive aggregates. Since the area of the surface of the mother toner particles, which is covered by the additive, changes depending on the aggregation degree of the external additive, the covering rate changes depending on the aggregation degree of the external additive. Even when the same external additive and mother toner particles are used, the covering rate changes depending on the methods and conditions of the addition process of the external additive.

In addition, the strength of adhesion of an external additive with mother toner particles depends on the methods and conditions of the addition process of the external additive. When the adhesion strength is low, the external additive tends to release from the mother particles, and the constitutional elements such as a photoreceptor tend to be damaged by free external additive particles.

As can be understood the above description, a toner having a preferable covering rate and a good adhesion strength can be prepared by carefully controlling addition conditions of the external additive depending on the mother toner particles and external additive used.

Suitable external additives for use in the toner of the present invention include known organic fine particles and inorganic fine particles. Specific examples of the organic fine particles include fine particles of acrylic polymers, but are not limited thereto. In particular, fine particles of polymethyl methacrylate or methyl methacrylate copolymers are preferable. Specific examples of the inorganic fine particles include silica, alumina, and titania, but are not limited thereto. When hygroscopic inorganic particles are used, it is preferable to treat the particles with an agent imparting hydrophobic properties to the particles. The treatment is performed by reacting particles with the hydrophobicity imparting agent at a high temperature. Specific examples of the hydrophobicity imparting agent include silane coupling agents, silicone oils and the like compounds, but are not limited thereto.

In the present invention, the external additives are added to mother toner particles by any known method using a mixing device such as V-shaped blenders, Henshel mixers, and mechanofusion mixers. In particular, Henschel mixers are preferably used. When mother toner particles and an external additive are mixed using a Henshel mixer, the rotation speed and rotation time of the rotation blade of the Henshel mixer are properly controlled to control the adhesion strength of the external additive to the mother particles and the degree of aggregation of the external additive on the surface of the mother toner particles. The rotation speed and rotation time of the rotation blade are determined depending on the various conditions of the mother particles and the external additive.

The particle diameter of the electrophotographic toner of the present invention is preferably from 3 to 10 $\mu$m. When the particle diameter is too small, the content of fine toner particles having a particle diameter of not greater than 1 $\mu$m increases, resulting in occurrence of image defects in the resultant toner images. On the contrary, when the particle diameter is too large, it is impossible to produce toner images having good resolution.

The materials for use in the toner of the present invention are not particularly limited. Suitable toners can be prepared by, for example, mixing a binder resin with additives such as a coloring agent, a charge controlling agent, a releasing agent (an offset preventing agent) and the like, and granulating the mixture so that the mixture has a proper particle diameter, and then adding an external additive.

The toner of the present invention can be employed as a magnetic toner serving as a magnetic one-component developer when a magnetic material is included therein. In addition, the toner can be employed itself as a non-magnetic toner serving as a non-magnetic one-component developer. Further, the toner can be employed as a non-magnetic toner in a magnetic two-component developer when used in combination with a magnetic carrier. It is preferable to use the toner of the present invention as a non-magnetic toner.

Specific examples of the binder resins for use in the toner of the present invention include homopolymers and copolymers of styrene compounds, such as styrene and chlorostyrene; monoolefins such as ethylene, propylene, butylene, and isobutylene; vinyl esters such as vinyl acetate, vinyl propionate, vinyl benzoate, and vinyl butyrate; esters of a-methylene aliphatic monocarboxylic acids such as methyl acrylate, ethyl acrylate, butyl acrylate, octyl acrylate, dodecyl acrylate, phenyl acrylate, methyl methacrylate, ethyl methacrylate, butyl methacrylate, and dodecyl methacrylate; vinyl ethers such as vinyl methyl ether, vinyl ethyl ether, and vinyl butyl ether; and vinyl ketones such as vinyl methyl ketone, vinyl hexyl ketone, and vinyl isopropenyl ketone. In particular, polystyrene, styrene-alkyl acrylate copolymers, styrene-alkyl methacrylate copolymers, styrene-acrylonitrile copolymers, styrene-butadiene copolymers, styrene-maleic anhydride copolymers, polyethylene, and polypropylene can be exemplified as the typical binder resin. In addition, polyester reins, polyurethane resins, epoxy resins, silicone resins, polyamide resins, modified rosin, and paraffin waxes can also be exemplified as the typical binder resin.

Specific examples of the coloring agents include carbon black, lampblack, Aniline Blue, chalco oil blue, Chrome Yellow, ultramarine blue, Du Pont Oil Red, Quinoline Yellow, Methylene Blue chloride, copper Phthalocyanine, Malachite Green oxalate, Rose Bengale, titanium oxide, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1, and C.I. Pigment Blue 15:3. The concentration of the coloring agent is from 1 to 30 parts by weight per 100 parts by weight of the binder resin used.

The charge controlling agents include positive-charge controlling agents and negative-charge controlling agents, which are properly used depending on the desired polarity of the toner to be manufactured. Specific examples of the positive charge controlling agents include oil soluble dyes such as Nigrosine Base (CI5045) and the like, organic compounds having a basic nitrogen atom, such as aminopyrin, pyrimidine compounds, polynuclear amino compounds, amino silane compounds, and fillers treated with one or more of the above-mentioned compounds.

Specific examples of the negative charge controlling agents include oil soluble dyes such as Oil Black (CI26150), Bontron S, and Spiron Black; charge controlling resins such as styrene—styrene sulfonic acid copolymers; compounds having a carboxyl group (such as metal chelate compounds of alkyl salicylic acid), metal complex dyes, fatty acid metallic soaps, resin acid soaps, and nephthenic acid metal salts. The charge controlling agents are used in an amount of from 0.1 to 10 parts by weight, and preferably from 0.5 to 8 parts by weight, per 100 parts by weight of the binder resin used.

Suitable releasing agents for use in the toner of the present invention include aliphatic hydrocarbons, aliphatic metal salts, higher fatty acids, and fatty acid esters and partially saponified compounds thereof; silicone oils, and waxes. The releasing agents are used in an amount of from 0.1 to 10 parts by weight per 100 parts by weight of the binder resin used.

Mother toner particles can be prepared by, for example, the following method:
(1) constitutional materials as mentioned above are mixed by a dry blender, a Henshel mixer, a ball mill or the like;
(2) the mixture is melt and kneaded using a kneader such as Banburry's mixers, roll kneaders, and one-axis or two-axis extrusion kneaders;
(3) the kneaded mixture is cooled and then pulverized; and
(4) the pulverized mixture is classified, if desired, to prepare mother toner particles.

In addition, mother toner particles can also be prepared by any known method such as suspension polymerizing methods, dispersion polymerizing methods, emulsion polymerizing methods, microcapsule polymerization methods, and spray drying methods.

The mother toner particles are then mixed with an external additive using a mixer such as Henshel mixers, V-shaped blenders, and hybridizers to prepare a toner in which the external additive is securely fixed on the surface of the mother toner particles.

Next, the electrophotographic photoreceptor for use in the present invention will be explained.

Photoreceptors such that a charge generation layer and a charge transport layer are formed in this order on an electroconductive substrate, and a protective layer is optionally formed thereon are used as the photoreceptor in the present invention. Any known substrates, charge generation layers and charge transport layers can be used as the substrate, charge generation layer and charge transport layer in the present invention.

The photoreceptors tend to have asperities on the surface thereof due to the rough surface of the substrate and/or the coated layers. When the asperities have a relatively long period compared to the particle diameter of the toner used, the influence of the asperities on the non-electrostatic adhesion force between the toner and the photoreceptor is small.

However, when the asperities have a period almost the same as the particle diameter of the toner used, the non-electrostatic adhesion force between the toner and the photoreceptor becomes small when the toner contacts the projected portions of the asperities. This is because the contact area of the toner and the photoreceptor decreases. On the contrary, when the toner contacts the recessed portions of the asperities, the non-electrostatic adhesion force between the toner and the photoreceptor becomes large because the contact area of the toner and the photoreceptor increases. Therefore, the distribution of the non-electrostatic adhesion force broadens.

When the asperities have a period smaller than the particle diameter of the toner used, the non-electrostatic adhesion force becomes small because the contact area of the toner with the photoreceptor decreases. However, it is difficult to form a photoreceptor having such a surface. Therefore it is preferable to prepare a photoreceptor whose surface has asperities having a period longer than the particle diameter of the toner used.

In the present invention, inorganic photosensitive materials such as selenium and its alloys, and amorphous silicon; and organic photosensitive materials can be used as the photosensitive material for use in the photoreceptor.

When organic photosensitive materials are used, suitable charge generation materials include phthalocyanine pigments such as X-type metal-free phthalocyanine, π-type metal-free phthalocyanine, τ-type metal-free phthalocyanine, ε-type copper phthalocyanine, α-type titanyl phthalocyanine, and β-type titanyl phthalocyanine; disazo or trisazo pigments, anthraquinone pigments, polycyclic quinone pigments, indigo pigments, diphenyl methane or trimethyl methane pigments, cyanine pigments, quinoline pigments, benzophenone or naphthoquinone pigments, perylene pigments, fluorenone pigments, Squarilium pigments, azulenium pigments, perynone pigments, quinacridone pigments, naphthalocyanine pigments, and porphyrin pigments.

The charge generation pigments, which can be used together with the above-mentioned acceptor compounds, are used in an amount of from 0.1 to 40% by weight, and preferably from 0.3 to 25% by weight, in the photosensitive layer.

Suitable positive hole transporting materials include compounds having a triphenyl amine group, hydrazone compounds, triphenyl methane compounds, oxadiazole compounds, compounds including a carbazole group, pyrazoline compounds, styryl compounds, butadiene compounds, polysilane compounds having a linear main chain including a silicon atom, and polymer doners such as polyvinyl carbazole. The positive hole transporting materials are used in the photosensitive layer in an amount of not less than 10% by weight and preferably from 20% to 60% by weight.

Suitable binder resins for use in the photosensitive layer include addition polymerization type resins, polyaddition type resins and polycondensation type resins, such as polyethylene, polypropylene, acrylic resins, methacrylic resins, vinyl chloride resins, vinyl acetate resins, epoxy resins, polyurethane resins, phenolic resins, polyester resins, alkyd resins, polycarbonate resins, and silicone resins, melamine resins; and copolymers including two or more of the repeating units of the resins mentioned above, such as vinyl chloride-vinyl acetate copolymers, and vinyl chloride-vinyl acetate-maleic anhydride copolymers. These binder resins are used in the photosensitive layer in an amount of from 20% to 90% by weight, and preferably from 30% to 70% by weight.

An undercoat layer can be formed between the photosensitive layer and the substrate to improve the charge properties. Suitable materials for use in the undercoat layer include the resins mentioned above for use as the binder resin in the photosensitive layer, and other known resins such as polyamide resins, polyvinyl alcohol resins, casein, and polyvinyl pyrrolidone resins.

The photoreceptor for use in the present invention is prepared, for example, by the following method:
(1) the undercoat layer is optionally formed on a substrate;
(2) the photosensitive layer is formed thereon by coating a coating liquid, which is prepared by dissolving the materials mentioned above in an organic solvent or dispersing the materials mentioned above in an organic solvent using a ball mill, a supersonic dispersing machine or the like, by a dipping method, a blade coating, a spray coating or the like, and then drying; and (3) a protective layer is optionally formed thereon by any known coating method mentioned above.

Suitable materials for use as the electroconductive substrate include plates, drums and foils of metals such as aluminum, nickel, copper, and stainless steel; plates, drums and films of plastics, on which a thin film of aluminum, tin oxide, or copper iodide is formed or adhered; and glass plates or drums on which the thin film mentioned above is formed.

Next, the image forming method and apparatus of the present invention will be explained referring to drawings.

The image forming method of the present invention includes latent image forming process in which an electrostatic latent image is formed on a photoreceptor, a developing process in which the latent image is developed with the toner of the present invention to form a toner image, and an image transferring process in which the toner image is transferred onto a receiving material.

The image forming apparatus includes a photoreceptor, a latent image forming device which forms an electrostatic latent image on the photoreceptor, a developing device which develops the latent image with the toner of the present invention to form a toner on the photoreceptor, and a transfer device which transfers the toner image onto a receiving material.

Figure 5:
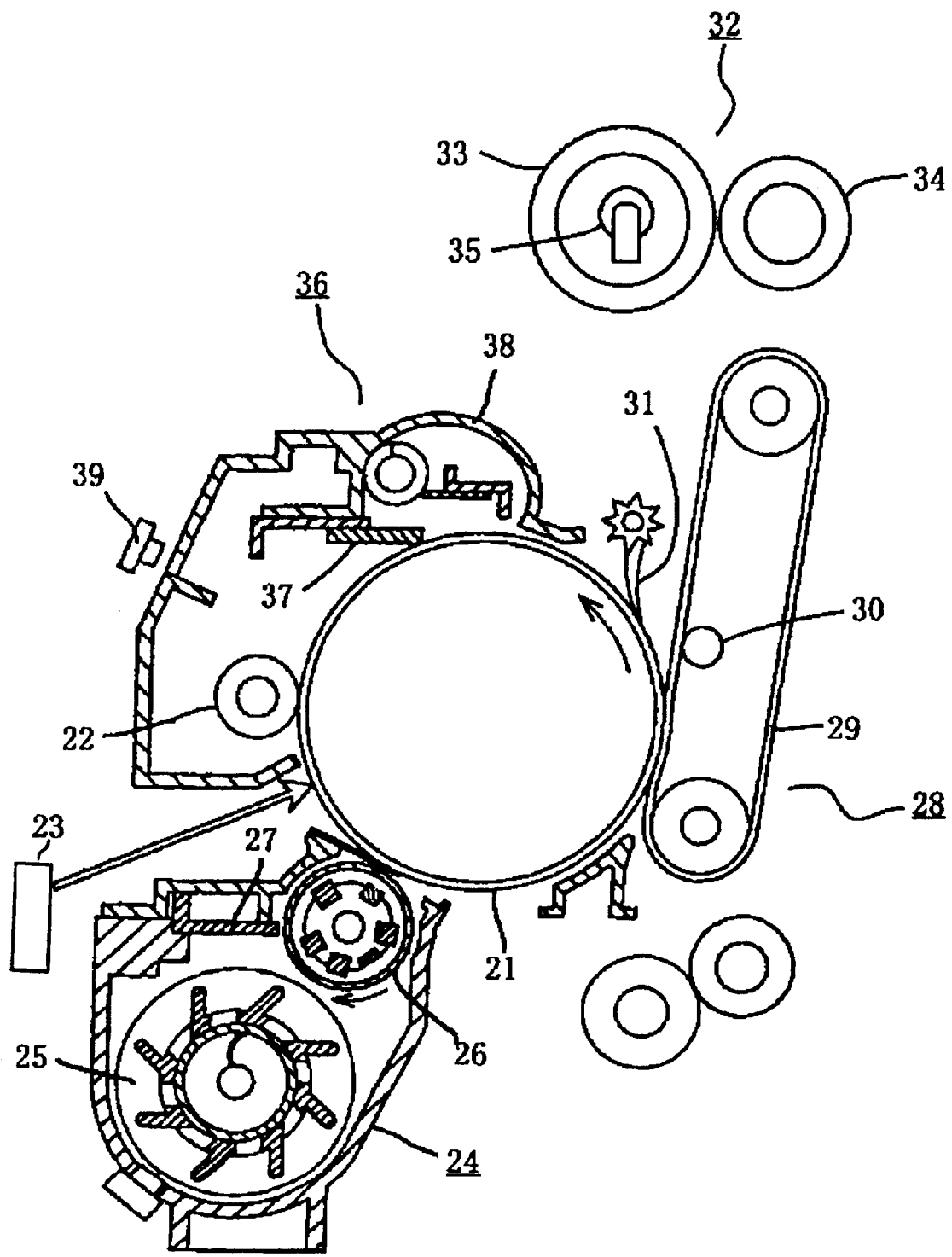
FIG. 5 is a schematic view illustrating an embodiment of an image forming apparatus of the present invention.

FIG. 5 is a schematic view illustrating an embodiment of the image forming apparatus of the present invention. In FIG. 5, the following devices are provided around a photoreceptor drum 21 serving as an image bearing member:
(1) a charging device 22 which charges the entire surface of the photoreceptor drum 21;
(2) a light irradiating device 23 which irradiates the surface of the photoreceptor drum 21 with imagewise laser light to form a latent image thereon;
(3) a developing device 24 which develops the latent image with the toner of the present invention to form a toner image on the photoreceptor;
(4) a transfer device 28 which transfers the toner image onto a receiving paper;
(5) a fixing device 32 which fixes the toner image on the receiving paper;
(6) a cleaning device which removes and collects the toner remaining on the surface of the photoreceptor after the image transferring process; and
(7) a discharging device which discharges the charge remaining on the photoreceptor after the image transferring process.

At this point, the latent image forming device includes the charging device 22 and the light irradiating device 23.

In detailed description, the surface of the photoreceptor drum 21 is uniformly charged by a charging roller 22. In FIG. 5, a charging roller is used, but a corona-charging device such as corotrons and scorotrons can also be used. The roller charging has an advantage in that the amount of ozone generated is less than in a method using corona charging. However, the roller charging method has a disadvantage in that a mechanism cleaning the roller 22 is needed because the roller is soiled by the toner remaining on the photoreceptor drum 21 contacting the roller 22.

The charged photoreceptor drum 21 is exposed to imagewise laser light, resulting in formation of an electrostatic latent image on the drum 21. The surface potential of the image area and non-image area of the photoreceptor 21 may be detected by a potential sensor to control the charging conditions and light irradiation conditions.

The latent image is developed with a developer including the toner of the present invention contained in the developing device 24, resulting in formation of a toner image on the photoreceptor drum 21. In the developing device 24, a screw 25 agitates and feeds the developer to supply the developer on a developing sleeve 26. The developer on the developing sleeve 26 is regulated with a doctor blade 27, resulting in formation of a uniform developer layer on the developing sleeve 26.

The thickness of the developer layer changes depending on the doctor gap formed between the doctor blade 27 and the developing sleeve 26. When the doctor gap is too narrow (i.e., the developer layer on the developing sleeve is too thin), the image density of the toner image decreases. On the contrary, when the doctor gap is too wide, a problem which occurs is that the carrier included in a two-component developer tends to adhere on the photoreceptor drum 21.

In the developing sleeve 26, magnets are provided to form ears of the developer on the periphery surface of the sleeve 26. The developer forms chain-shaped ears on the sleeve 26 along the normal lines of the magnetic force of the magnets, resulting in formation of a magnetic brush.

The developing sleeve 26 and the photoreceptor drum 21 are arranged such that they face each other with a gap (i.e., a developing gap) therebetween. Developing is performed at a position at which the developing sleeve 26 faces the photoreceptor drum 21 (this area is referred to as developing area).

The developing sleeve 26 is formed of a cylinder of a non-magnetic material such as aluminum, brass, stainless steel, and electroconductive resins. The developing sleeve 26 is rotated by a driving mechanism (not shown) in a direction as shown by an arrow. The magnetic brush formed on the sleeve 26 is fed to the developing area because the sleeve 26 rotates. A developing voltage is applied to the sleeve 26 by a power source (not shown). The toner on the magnetic brush is released from the carrier and adhered to an electrostatic latent image due to the developing electric field, which is formed between the sleeve 26 and the photoreceptor 21 due to the developing voltage, resulting in formation of a toner image. An AC voltage may be overlapped to the developing voltage.

The developing gap is preferable from 5 to 30 times the particle diameter of the developer used. Namely, when the developer has a particle diameter of 50 $\mu$m, it is preferable that the developing gap is from 0.25 to 1.5 mm. It is possible to form a gap having such a dimension. When the developing gap is too wide, desirable image density cannot be obtained. The doctor gap is preferably set so as to be the same as or slightly greater than the developing gap.

The diameter and linear speed of the drum 21, and diameter and linear speed of the developing sleeve 26 are determined depending on the copying speed and the dimension of the image forming apparatus. The ratio (Ss/Sd) of the linear speed (Sd) of the drum 21 to the linear speed (Ss) of the sleeve 26 is preferably not less than 1.1 to obtain good image density. In addition, in order to obtain good image density, a sensor can be provided at a position after the developing device 24 to detect the toner quantity on the sleeve 26 by measuring the optical reflectivity of the developer layer formed on the sleeve 26.

In FIG. 5, a two-component developing method using a developer including a carrier and a toner is used, however the present invention is not limited thereto, and one-component developing method in which a latent image is developed with a toner layer formed on a developing sleeve.

Suitable materials for use as the carrier of the two component developer, which constitutes the magnetic brush, include iron powders, ferrite powders, resin particles in which a magnetic powder is dispersed, and magnetic powders which are coated with a resin to control the electric properties thereof. It is preferable to use spherical particles to reduce the damage of the photoreceptor drum 21. The diameter of the particles is preferably not greater than 150 μm.

When the average particle diameter of the carrier is too large, the area of the surface of the photoreceptor drum 21 which the carrier does not contact increases, resulting in occurrence of image defects. On the contrary, when the average particle diameter of the carrier is too small, the carrier particles easily move when an AC voltage is applied as the developing voltage, resulting in occurrence of carrier adhesion on the photoreceptor drum 21. Therefore, the average particle diameter of the carrier particles is preferably from 30 μm to 100 μM.

In addition, when the volume resistivity of the carrier is too low, charges are injected into the carrier when a developing voltage is applied, resulting in occurrence of carrier adhesion on the photoreceptor drum 21 and breakdown of the photoreceptor drum 21. Therefore, it is preferable to use a carrier having a volume resistivity not less than $10^3$ Ohm·cm.

The toner images formed on the photoreceptor drum 21 are fed to a transfer nip at which the photoreceptor drum 21 contacts a transfer belt 29. On the other hand, a receiving paper is fed to the transfer nip from a paper tray (not shown). A transfer voltage having a polarity opposite to that of the toner used is applied to a bias roller 30 by a power source (not shown) The toner images formed on the photoreceptor drum 21 are transferred on the receiving paper due to the transfer electric field formed between the photoreceptor drum 21 and the transfer belt 29.

In FIG. 5, the transfer belt 29 is used as the transfer member, however a transfer roller can also be used. The transfer belt 29 has an advantage in that the transfer nip is wide. In addition, a transfer method using corona charging, in which the receiving paper is charged by applying from the backside thereof a corona charge having a polarity opposite to that of the toner to transfer the toner images, can also be used, instead of the transfer method using the transfer belt 29.

The transfer methods in which a transfer voltage is applied to a transfer belt or a transfer roller have an advantage over the transfer method using corona charge in that the receiving paper is easily separated from the photoreceptor drum 21 because of having a small amount of charge. Therefore, image defects, which are caused by discharge generated in separation of the receiving paper and the photoreceptor drum 21, tend not to be produced. However, the method using a transfer belt or a transfer roller has drawbacks in that a cleaning mechanism is needed to remove the toner remaining on the transfer belt and roller, and hollow defects tend to be produced in the center part of images.

The receiving paper contacting the photoreceptor drum 21 is separated from the photoreceptor drum 21 with a separation pick 31 after transferring the toner images. The toner images on the receiving paper are fixed upon application of heat and pressure by a fixing roller 33 and a pressure roller 34. A thermistor (not shown) is arranged so as to contact the fixing roller to control the fixing temperature by controlling a fixing heater 35. The fixing method using a fixing roller has the following advantages:
(1) heat efficiency is high;
(8) being reliable;
(9) the fixing unit can be minimized; and
(10) being able to be used in low speed fixing methods to high speed fixing methods.

The toner remaining on the photoreceptor drum 21 without being transferred onto the receiving paper is removed therefrom by a cleaning blade 37, and then collected by a toner collector 38. In FIG. 5, the cleaning blade 37 is used, however a cleaning method in which a highly-rotated fur brush removes the remaining toner can also be used. The method using a cleaning blade has following advantages:
(1) toner removing capacity is high; and
(2) the cleaning unit can be minimized and manufactured at a low cost because the cleaning blade has a simple structure.

The photoreceptor drum 21 is then discharged by a discharge lamp 39 to be initialized. The initialized photoreceptor 21 is subjected to the image forming operations mentioned above for producing the next images.

FIG. 5 illustrates a black and white image forming apparatus using a single developing unit, however the image forming apparatus of the present invention is not limited thereto. Image forming apparatus having a photoreceptor and a plurality of developing units, or image forming apparatus having a plurality of photoreceptors and developing units, which are useful for producing color images, can also be used.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

At first, mother toner particles having an irregular form for use in the examples will be explained.

The following components were mixed in a Henshel mixer.

| | |
|---|---|
| Polyester resin | 80 |
| (weight average molecular weight of 250,000) | |
| Styrene-methyl methacrylate copolymer | 20 |
| Oxidized rice wax | 5 |
| (acid value of 15) | |
| Carbon black | 8 |
| (#44 manufactured Mitsubishi Kasei Corporation) | |
| Monoazo dye having a metal | 3 |

The mixture was melted by being heated at a temperature of from 130 to 140° C. for 30 minutes using a roll mill. After being cooled to room temperature, the mixture was crushed with a hammer mill such that the resultant mixture powder has a diameter of from 1 mm to 2 mm. Then the powder was pulverized with a jet mill, and then classified. Thus, mother toner particles A having a volume average particle diameter of 4.1 μm, mother toner particles B having a volume average particle diameter of 7.2 μm, and mother toner particles C having a volume average particle diameter of 9.1 μm were prepared. In addition, mother toner particles D having a volume average particle diameter of 7.2 μm and a particle diameter distribution narrower than that of the mother toner particles B were also prepared.

Figure 6:
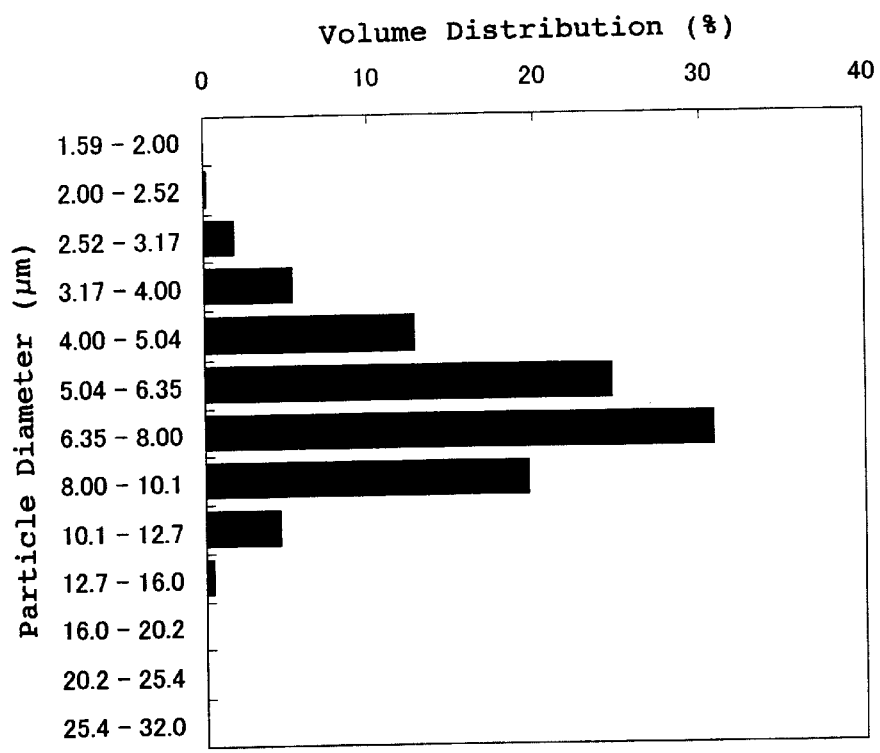
FIG. 6 is a graph illustrating the particle diameter distribution curve of the mother toner particles B prepared in Examples.
Figure 7:
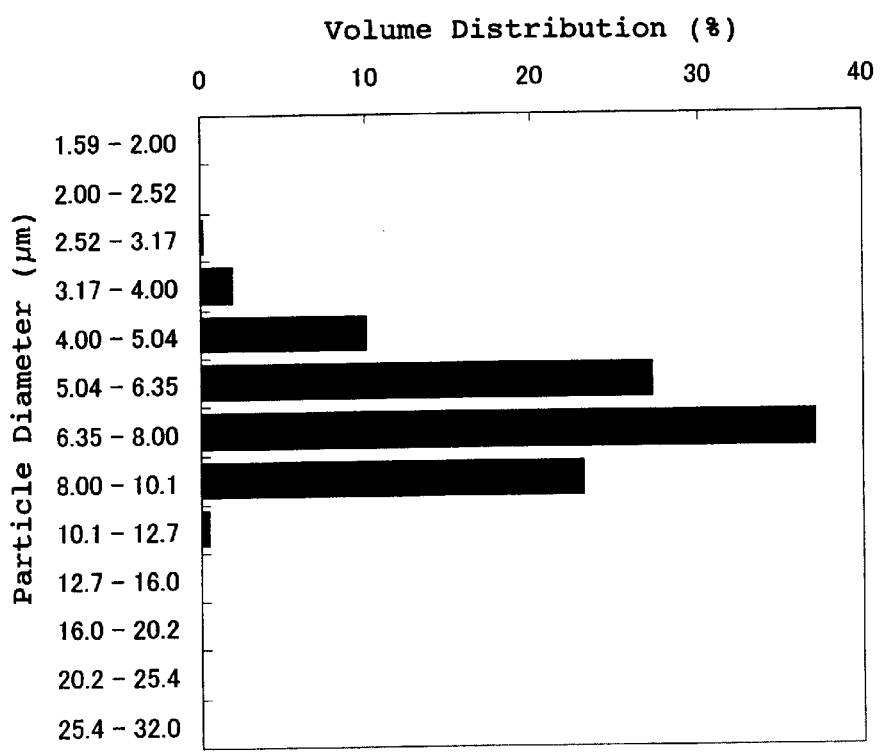
FIG. 7 is a graph illustrating the particle diameter distribution curve of the mother toner particles D prepared in Examples.

The particle diameter distribution was measured using a particle diameter measuring instrument TA-II manufactured by Coulter Electronics, Inc., while dispersing the mother toner particles in an electrolytic aqueous solution including a neutral surfactant. FIG. 6 illustrates a particle diameter distribution of the mother toner particles B, and FIG. 7 illustrates a particle diameter distribution of the mother toner particles D.

Example 1

A silica A (Tradenamed as TS-720 manufactured by Cabot Corp.) having a primary particle diameter of 14 nm was added to the mother toner particles A such that the content of the silica A in the mixture of the mother toner particles and the silica A is 0.6% by weight. The mixture was mixed and stirred with a Henshel mixer. The rotation speed of the blade of the Henshel mixer was 1500 rpm and the rotation time was 5 minutes.

Thus a toner was prepared.

Example 2

The silica A and the mother toner particles A were mixed in the same way as performed in Example 1 to prepare a toner except that the content of the silica A was 0.8% by weight.

Example 3

The silica A and the mother toner particles A were mixed in the same way as performed in Example 1 to prepare a toner except that the content of the silica A was 1.5% by weight and the rotation speed was 2000 rpm.

Example 4

The silica A and the mother toner particles A were mixed in the same way as performed in Example 1 to prepare a toner except that the content of the silica A was 2.5% by weight and the rotation speed was 2500 rpm.

Example 5

The silica A and the mother toner particles A were mixed in the same way as performed in Example 1 to prepare a toner except that the content of the silica A was 4.0% by weight and the rotation speed was 3000 rpm.

Example 6

The silica A and the mother toner particles B were mixed in the same way as performed in Example 1 to prepare a toner except that the content of the silica A was 0.3% by weight.

Example 7

The silica A and the mother toner particles B were mixed in the same way as performed in Example 1 to prepare a toner except that the content of the silica A was 0.4% by weight.

Example 8

The silica A and the mother toner particles B were mixed in the same way as performed in Example 1 to prepare a toner except that the content of the silica A was 1.0% by weight and the rotation speed was 2000 rpm.

Example 9

The silica A and the mother toner particles B were mixed in the same way as performed in Example 1 to prepare a toner except that the content of the silica A was 2.0% by weight and the rotation speed was 2500 rpm.

Example 10

The silica A and the mother toner particles B were mixed in the same way as performed in Example 1 to prepare a toner except that the content of the silica A was 3.0% by weight and the rotation speed was 3000 rpm.

Example 11

The silica A and the mother toner particles C were mixed in the same way as performed in Example 1 to prepare a toner except that the content of the silica A was 0.2% by weight.

Example 12

The silica A and the mother toner particles C were mixed in the same way as performed in Example 1 to prepare a toner except that the content of the silica A was 0.3% by weight.

Example 13

The silica A and the mother toner particles C were mixed in the same way as performed in Example 1 to prepare a toner except that the content of the silica A was 0.7% by weight.

Example 14

The silica A and the mother toner particles C were mixed in the same way as performed in Example 1 to prepare a toner except that the content of the silica A was 1.5% by weight and the rotation speed was 2000 rpm.

Example 15

The silica A and the mother toner particles C were mixed in the same way as performed in Example 1 to prepare a toner except that the content of the silica A was 2.5% by weight and the rotation speed was 2500 rpm.

Comparative Example 1

The silica A and the mother toner particles A were mixed in the same way as performed in Example 1 to prepare a toner except that the content of the silica A was 0.3% by weight.

Comparative Example 2

The silica A and the mother toner particles B were mixed in the same way as performed in Example 1 to prepare a toner except that the content of the silica A was 0.1% by weight.

Comparative Example 3

The silica A and the mother toner particles C were mixed in the same way as performed in Example 1 to prepare a toner except that the content of the silica A was 0.1% by weight.

The thus prepared toners were evaluated with respect to the covering rate, non-electrostatic adhesion force, and image qualities by the following methods.

(Covering rate)

A toner was adhered on a plate, and then coated with gold. The coated toner was observed with an electron microscope (Scanning Electron Microscope S-4500 manufactured by Hitachi Ltd.). The toner image, which was enlarged by 30000 times, was input into a personal computer to determine the covering rate using an image processing software (Image-Pro Plus manufactured by Media Cybernetics Co.). The covering rate is determined as the ratio of the area of the external additive adhered on a toner particle to the surface area of the toner particle. The results are shown in Table 1.

(Adhesion force)

A photoreceptor was prepared by the following method:
(1) the following components was mixing in a ball mill to prepare a pigment dispersion:
Bisazo pigment having the formula (4) 0.4
Butyral resin solution of tetrahydrofuran 4 (solid content of 5%, butyral resin: S-lec BL-S manufactured by Sekisui Chemical Co., Ltd.)
Tetrahydrofuran 7.6

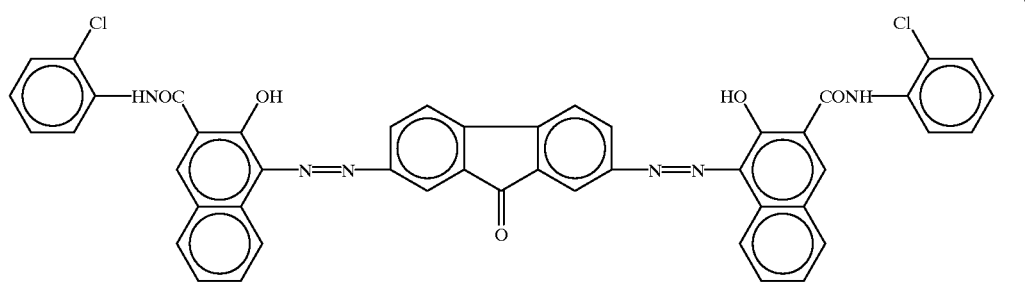

(4)

After milling, tetrahydrofuran was added to the dispersion to dilute the dispersion such that the solid content was 2%. Thus a charge generation layer coating liquid was prepared.

The charge generation layer coating liquid was coated on an aluminum layer having a thickness of 100 nm, which had been previously deposited a PET film having a thickness of 75 μm using a doctor blade, and then dried.
(2) the following components were mixed to prepare a charge transport layer coating liquid:
Positive hole transporting compound having the
Following formula (5) 6
15% cyclohexylidenebisphenol polycarbonate solution of tetrahydrofuran 76
(9 parts of a Z type polycarbonate, tradenamed as TS2050 manufactured by Teijin Chemicals, Ltd., was dissolved in 67 parts of tetrahydrofuran)

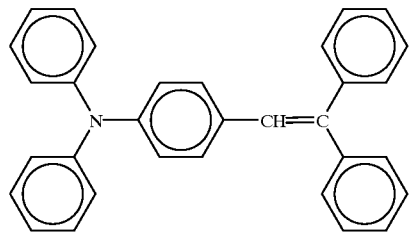

(5)

The charge transport layer coating liquid was coated on the charge generation layer with a doctor blade and then dried to form a charge transporting layer of 20 μm thick. Thus a photoreceptor was prepared.

The photoreceptor film was cut to prepare a circular photoreceptor film having a diameter of 7.8 mm. The circular film was adhered on the substrate 2 as shown in FIG. 1 using an adhesive. A toner, which was not charged, was scattered by blowing compressed air so as to be adhered on the photoreceptor film.

According to the centrifugal separation method mentioned above, the non-electrostatic adhesion force between the toner and the photoreceptor was measured and then the proportionality factor K and standard deviation σ were determined. The results are shown in Table 1.

The measuring instrument and measuring conditions are as follows:
(1) Centrifuge: Ultracentrifuge CP100a manufactured by Hitachi Koki Co., Ltd.
Maximum rotation speed: 100,000 rpm
Maximum acceleration: 800,000g
(2) Rotor: Angle rotor, P100AT, manufactured by Hitachi Koki Co., Ltd.
(3) Image processor: Hyper 700 manufactured by Interquest Corp.
(4) Substrate 2 and Receiving plate 3: An aluminum disc having a diameter of 8 mm and a thickness of 1.5 mm
(1) Spacer: An aluminum ring having an outside diameter of 8 mm, an inside diameter of 5.2 mm and a thickness of 1 mm
(2) Cylinder 7a: An aluminum cylinder having a diameter of 13 mm and a height of 59 mm
(3) Distance between the center axis of the rotor and the receiving plate: 64.5 mm
(4) Rotation speed f: 1000, 1600, 2200, 2700, 3200, 5000, 7100, 8700, 10000, 15800, 22400, 31600, 50000, 70700, 86600, and 100000 rpm (Image qualities)

Each toner was mixed with a carrier, which is used for a copier Imagio MF3550 (Black and white copier using a two-component developer and manufactured by Ricoh Co., Ltd.), to prepare a two-component developer having a toner concentration of 2.5% by weight. The developer was set in Imagio MF3550, and a running test was performed in which 50000 images were continuously produced. At this point, a photoreceptor drum, in which the charge generation layer and charge transport layer mentioned above for use in the photoreceptor used for measuring the adhesion force were formed on an aluminum drum having a diameter of 60 mm by a dipping method, was used as the photoreceptor of the copier Imagio MF3550. Each toner was evaluated using a new photoreceptor drum.

The copying conditions were as follows:
(1) Copying speed: 35 CPM
(2) Linear speed of photoreceptor drum: 180 mm/s
(3) Density of picture elements: 400 dpi
(4) Surface potential of photoreceptor drum: −150 V—−950 V
(5) Developing voltage: −550 V The initial image and the 50000th image were observed by naked eyes and a CCD microscope (Hypermicroscope manufactured by Keyence Corporation) to determine whether there were background development and hollow defects.

The background development and hollow defects were classified into the following four grades by comparing four-grade standard samples:

4: Excellent (there is no problem)
3: Good (there is almost no problem)
2: The image has a minor problem
1: The image has a serious problem

TABLE 1

| Toner | Covering rate (%) | K (nN/μm) | σ | Image quality (Initial) Background development | Image quality (Initial) Hollow defects | Image quality (50000th image) Background Development | Image quality (50000th image) Hollow defects |
|---|---|---|---|---|---|---|---|
| Ex. 1 | 6.8 | 3.12 | 0.655 | 3 | 4 | 3 | 3 |
| Ex. 2 | 8.6 | 2.41 | 0.639 | 4 | 4 | 3 | 3 |
| Ex. 3 | 14.1 | 1.58 | 0.601 | 4 | 4 | 4 | 4 |
| Ex. 4 | 21.1 | 1.10 | 0.553 | 4 | 4 | 4 | 4 |
| Ex. 5 | 30.6 | 0.97 | 0.502 | 4 | 4 | 4 | 4 |
| Ex. 6 | 6.9 | 2.92 | 0.656 | 3 | 4 | 3 | 3 |
| Ex. 7 | 8.7 | 2.38 | 0.604 | 4 | 4 | 3 | 4 |
| Ex. 8 | 17.9 | 1.25 | 0.574 | 4 | 4 | 4 | 4 |
| Ex. 9 | 31.0 | 0.98 | 0.501 | 4 | 4 | 4 | 4 |
| Ex. 10 | 42.6 | 0.97 | 0.471 | 4 | 4 | 4 | 4 |
| Ex. 11 | 6.4 | 3.16 | 0.662 | 3 | 4 | 3 | 3 |
| Ex. 12 | 8.9 | 2.35 | 0.64 | 4 | 4 | 4 | 4 |
| Ex. 13 | 17.4 | 1.30 | 0.581 | 4 | 4 | 4 | 4 |
| Ex. 14 | 31.7 | 0.98 | 0.502 | 4 | 4 | 4 | 4 |
| Ex. 15 | 47.4 | 0.96 | 0.465 | 4 | 4 | 4 | 4 |
| Comp. Ex. 1 | 3.9 | 5.21 | 0.680 | 2 | 2 | 1 | 1 |
| Comp. Ex. 2 | 2.9 | 6.33 | 0.688 | 2 | 2 | 1 | 2 |
| Comp. Ex. 3 | 3.7 | 5.10 | 0.683 | 2 | 2 | 1 | 2 |

As can be understood from Table 1, the covering rate changes depending on the particle diameter of the mother toner particles and the concentration of the external additive. The toners of Examples 2 to 5, 7 to 10 and 12 to 15, which have a covering rate of not less than 8%, a proportional factor K of not greater than 5 nN/μm, and a standard deviation σ of not greater than 0.65, can produce good images during the running test. The toners of Examples 1, 6 and 11 have a proportional factor k of not greater than 5 nN/μm although they have a covering rate of not greater than 8% and a standard deviation σ of not less than 0.65. Therefore, they can produce images whose image qualities are slightly inferior to those of the toners of Examples 2–5, 7–10 and 12–15 but have almost no problem.

On the contrary, the toners of Comparative Examples 1 to 3, which have a proportionality factor k of not less than 5 nN/μm, a covering rate of not greater than 8% and a standard deviation a of not less than 0.65, produced images having poor image qualities during the running test.

Example 16

The silica A and the mother toner particles D were mixed in the same way as performed in Example 1 to prepare a toner except that the content of the silica A was 0.2% by weight.

Example 17

The silica A and the mother toner particles D were mixed in the same way as performed in Example 1 to prepare a toner except that the content of the silica A was 0.3% by weight.

Example 18

The silica A and the mother toner particles D were mixed in the same way as performed in Example 1 to prepare a toner except that the content of the silica A was 1% by weight and the rotation speed was 2000 rpm.

Comparative Example 4

The silica A and the mother toner particles D were mixed in the same way as performed in Example 1 to prepare a toner except that the content of the silica A was 0.1% by weight.

The thus prepared toners of Examples 16 to 18 and Comparative Example 4 were also evaluated in the same way as mentioned above. The results are shown in Table 2.

TABLE 2

| Toner | Covering rate (%) | K (nN/μm) | σ | Image quality (Initial) Background development | Image quality (Initial) Hollow defects | Image quality (50000th image) Background development | Image quality (50000th image) Hollow defects |
|---|---|---|---|---|---|---|---|
| Ex. 16 | 5.2 | 3.84 | 0.664 | 3 | 4 | 3 | 3 |
| Ex. 17 | 7.1 | 2.92 | 0.643 | 4 | 4 | 3 | 4 |
| Ex. 18 | 18.2 | 1.25 | 0.562 | 4 | 4 | 4 | 4 |
| Comp. Ex. 4 | 3.0 | 6.13 | 0.681 | 2 | 2 | 1 | 2 |

As can be understood from Table 2, the toner of Example 17, which has a proportionality factor K of not greater than 5 nN/μm and a standard deviation σ of not greater than 0.65 although it has a covering rate of not greater than 8%, can produce good images during the running test. The mother toner particles of this toner has a sharp particle diameter distribution, and therefore the standard deviation is not greater than 0.65 even when the covering rate is not greater than 8%.

The toner of Example 18 has a covering rate of not less than 8%, a proportionality factor k of not greater than 5 nN/μm and a standard deviation σ of not greater than 0.65. Therefore, they can produce good images.

The toner of Example 16 has a proportional factor k of not greater than 5 nN/μm although the standard deviation σ is not less than 0.65. Therefore, the toner produced images, whose image qualities are slightly inferior to those of the toners of Examples 17 and 18 but have almost no problem.

On the contrary, the toner of Comparative Example 4, which has a covering rate of not greater than 8%, a proportional factor K of not less than 5 nN/μm, and a standard deviation σ of not less than 0.65, produced images having poor image qualities during the running test.

Example 19

A toner was prepared in the same way as performed in Example 8 except that the silica A was replaced with a hydrophobic silica B having an average primary particle diameter of 40 nm (Tradenamed as RY-50 manufactured by Nippon Aerosil Co.).

Example 20

A toner was prepared in the same way as performed in Example 9 except that the silica A was replaced with a silica B having an average primary particle diameter of 40 nm (Tradenamed as RY-50 manufactured by Nippon Aerosil Co.).

Example 21

A toner was prepared in the same way as performed in Example 10 except that the silica A was replaced with a silica B having an average primary particle diameter of 40 nm (Tradenamed as RY-50 manufactured by Nippon Aerosil Co.).

Comparative Example 5

A toner was prepared in the same way as performed in Example 19 except that the content of the silica B was changed from 1.0% to 0.3% by weight, and the rotation speed was changed from 2000 to 1500 rpm.

Comparative Example 6

A toner was prepared in the same way as performed in Example 19 except that the content of the silica B was changed from 1.0% to 0.8% by weight.

The thus prepared toners of Examples 19 to 21 and Comparative Examples 5 and 6 were also evaluated in the same way as mentioned above. The results are shown in Table 3.

TABLE 3

| Toner | Covering rate (%) | K (nN/$\mu$m) | $\sigma$ | Image quality (Initial) | | Image quality ($50000^{th}$ image) | |
|---|---|---|---|---|---|---|---|
| | | | | Background development | Hollow defects | Background development | Hollow defects |
| Ex. 19 | 8.2 | 4.62 | 0.632 | 4 | 4 | 3 | 3 |
| Ex. 20 | 14.1 | 3.60 | 0.581 | 4 | 4 | 4 | 4 |
| Ex. 21 | 19.5 | 3.10 | 0.540 | 4 | 4 | 4 | 4 |
| Comp. Ex. 5 | 3.2 | 7.95 | 0.681 | 2 | 2 | 1 | 1 |
| Comp. Ex. 6 | 6.8 | 5.28 | 0.652 | 3 | 3 | 2 | 2 |

As can be understood from Tables 1 and 3, the proportionality factor K, standard deviation $\sigma$ and covering rate of the toners of Examples 19 to 21 are different from those of the toners of Examples 8 to 10. This is caused by the difference of the external additive (silica A or B) in primary particle diameter.

The toners of Examples 19 to 21 have a covering rate of not less than 8%, a proportionality factor K of not greater than 5 nN/$\mu$m and a standard deviation $\sigma$ of not greater than 0.65. Therefore they can produce good images.

On the contrary, the toners of Comparative Examples 5 and 6, which have a covering rate of not greater than 8%, a proportionality factor k of not less than 5 nN/$\mu$m, and a standard deviation $\sigma$ of not less than 0.65, produce images having poor image qualities during the running test.

Example 22

A toner was prepared in the same way as performed in Example 6 except that the silica A was replaced with a hydrophobic titanium oxide A having an average primary particle diameter of 15 nm (Tradenamed as MT-150A manufactured by Tayca Corp.).

Example 23

A toner was prepared in the same way as performed in Example 7 except that the silica A was replaced with a hydrophobic titanium oxide A having an average primary particle diameter of 15 nm (Tradenamed as MT-150A manufactured by Tayca Corp.).

Example 24

A toner was prepared in the same way as performed in Example 8 except that the silica A was replaced with a hydrophobic titanium oxide A having an average primary particle diameter of 15 nm (Tradenamed as MT-150A manufactured by Tayca Corp.).

Example 25

A toner was prepared in the same way as performed in Example 9 except that the silica A was replaced with a hydrophobic titanium oxide A having an average primary particle diameter of 15 nm (Tradenamed as MT-150A manufactured by Tayca Corp.).

Example 26

A toner was prepared in the same way as performed in Example 10 except that the silica A was replaced with a hydrophobic titanium oxide A having an average primary particle diameter of 15 nm (Tradenamed as MT-150A manufactured by Tayca Corp.).

Comparative Example 7

A toner was prepared in the same way as performed in Example 22 except that the content of the titanium oxide A was changed from 0.3% to 0.1% by weight.

The thus prepared toners of Examples 22 to 26 and Comparative Example 7 were also evaluated in the same way as mentioned above. The results are shown in Table 4.

TABLE 4

| Toner | Covering rate (%) | K (nN/$\mu$m) | $\sigma$ | Image quality (Initial) | | Image quality ($50000^{th}$ image) | |
|---|---|---|---|---|---|---|---|
| | | | | Background development | Hollow defects | Background development | Hollow defects |
| Ex. 22 | 6.6 | 4.20 | 0.657 | 3 | 4 | 3 | 3 |
| Ex. 23 | 8.4 | 3.45 | 0.640 | 4 | 4 | 3 | 3 |
| Ex. 24 | 17.6 | 2.96 | 0.576 | 4 | 4 | 4 | 4 |
| Ex. 25 | 30.1 | 2.43 | 0.509 | 4 | 4 | 4 | 4 |
| Ex. 26 | 41.9 | 1.95 | 0.467 | 4 | 4 | 4 | 4 |
| Comp. Ex. 7 | 2.8 | 7.38 | 0.689 | 2 | 2 | 1 | 1 |

As can be understood from Tables 1 and 4, the proportionality factor K, standard deviation $\sigma$ and covering rate of the toners of Examples 22 to 26 are different from those of the toners of Examples 6 to 10. This is caused by the difference of the species of the external additive (silica A or titanium oxide A).

The toners of Examples 23 to 26 have a covering rate of not less than 8%, a proportionality factor K of not greater than 5 nN/um and a standard deviation $\sigma$ of not greater than 0.65. Therefore they can produce good images.

The toner of Example 22 has a proportionality factor K of not greater than 5 nN/um although it has a covering rate of not greater than 8% and a standard deviation $\sigma$ of not less than 0.65. Therefore the toners produce images whose image qualities are slightly inferior to those of the toners of Examples 23 to 26 but have almost no problem.

On the contrary, the toner of Comparative Example 7, which has a covering rate of not greater than 8%, a proportionality factor K of not less than 5 nN/$\mu$m, and a standard deviation $\sigma$ of not less than 0.65, produces images having poor image qualities during the running test.

Next, the method for preparing spherical mother toner particles for use in the examples.

The following monomer liquid and dispersion medium were mixed with a homogenizer (manufactured by Tokushu Kika Kogyo Co., Ltd.) for 10 minutes under a condition of 9500 rpm in rotation speed. Thus a suspension was prepared.

| (Monomer liquid) | |
|---|---|
| Styrene | 20 |
| n-butyl acrylate | 17.8 |
| Carbon black | 1 |
| (Tradenamed as MA-100 manufactured by Mitsubishi Chemical Corp.) | |
| Charge controlling agent | 0.3 |
| (Tradenamed as E-84 manufactured by Orient Chemical Industries Co., Ltd.) | |
| Initiator (ADVN) | 1 |
| (Dispersion medium) | |
| Deionized water | 150 |
| Polyvinyl alcohol | 5.2 |

The suspension was heated in a water bath of 60° C. while being stirred for 8 hours. Thus the suspension was polymerized. After polymerization, the suspension was allowed to settle at room temperature for one night to precipitate the polymer. The polymer was subjected to a reprecipitation treatment using deionized water. Then the polymer was sieved using a 150-mesh screen to remove aggregates. In addition, the polymer was subjected to a centrifugal precipitation treatment. The polymer was filtered and then dried under a reduced pressure. Thus spherical mother toner particles E having a volume average particle diameter of 7.3 µm were prepared.

Example 27

A toner was prepared in the same way as performed in Example 1 except that the mother toner particles A were replaced with the mother toner particles E and the content of the external additive (silica A) was changed from 0.6% by weight to 0.2% by weight.

Example 28

A toner was prepared in the same way as performed in Example 27 except that the content of the external additive (silica A) was 0.5% by weight.

Example 29

A toner was prepared in the same way as performed in Example 27 except that the content of the external additive (silica A) was 1.5% by weight and the rotation speed was changed from 1500 rpm to 2000 rpm.

Example 30

A toner was prepared in the same way as performed in Example 19 except that the mother toner particles B were replaced with the mother toner particles E, the content of the external additive (silica B) was changed from 1.0% by weight to 0.5% by weight, and the rotation speed was changed from 2000 rpm to 1500 rpm.

Example 31

A toner was prepared in the same way as performed in Example 30 except that the content of the external additive (silica B) was 1.5% by weight and the rotation speed was 2000 rpm.

Example 32

A toner was prepared in the same way as performed in Example 30 except that the content of the external additive (silica B) was 2.5% by weight and the rotation speed was 2500 rpm.

Example 33

A toner was prepared in the same way as performed in Example 22 except that the mother toner particles B were replaced with the mother toner particles E, and the content of the external additive (titanium oxide A) was changed from 0.3% by weight to 0.2% by weight.

Example 34

A toner was prepared in the same way as performed in Example 33 except that the content of the external additive (titanium oxide A) was 0.5% by weight.

Example 35

A toner was prepared in the same way as performed in Example 33 except that the content of the external additive (titanium oxide A) was 1.5% by weight and the rotation speed was 2000 rpm.

Comparative Example 8

A toner was prepared in the same way as performed in Example 27 except that the content of the external additive was 0.1% by weight.

Comparative Example 9

A toner was prepared in the same way as performed in Example 30 except that the content of the external additive was 0.3% by weight.

Comparative Example 10

A toner was prepared in the same way as performed in Example 33 except that the content of the external additive was 0.1% by weight.

The thus prepared toners of Examples 27 to 35 and Comparative Examples 8 to 10 were also evaluated in the same way as mentioned above. The results are shown in Table 5.

TABLE 5

| Toner | Covering rate (%) | K (nN/µm) | σ | Image quality (Initial) | | Image quality (50000$^{th}$ image) | |
|---|---|---|---|---|---|---|---|
| | | | | Background development | Hollow defects | Background development | Hollow defects |
| Ex. 27 | 9.5 | 2.45 | 0.621 | 4 | 4 | 3 | 4 |
| Ex. 28 | 20.1 | 1.04 | 0.529 | 4 | 4 | 4 | 4 |
| Ex. 29 | 48.5 | 0.842 | 0.438 | 4 | 4 | 4 | 4 |
| Ex. 30 | 9.3 | 4.23 | 0.619 | 4 | 4 | 3 | 4 |
| Ex. 31 | 22.3 | 2.86 | 0.521 | 4 | 4 | 4 | 4 |
| Ex. 32 | 33.1 | 2.62 | 0.490 | 4 | 4 | 4 | 4 |
| Ex. 33 | 9.2 | 3.54 | 0.632 | 4 | 4 | 3 | 4 |
| Ex. 34 | 19.5 | 2.38 | 0.541 | 4 | 4 | 4 | 4 |
| Ex. 35 | 46.8 | 1.25 | 0.445 | 4 | 4 | 4 | 4 |
| Comp. Ex. 8 | 5.7 | 7.32 | 0.675 | 2 | 2 | 1 | 2 |
| Comp. Ex. 9 | 6.1 | 8.72 | 0.664 | 2 | 2 | 1 | 2 |
| Comp. Ex. 10 | 5.5 | 7.88 | 0.681 | 2 | 2 | 1 | 2 |

As can be understood from Tables 1, 3, 4 and 5, the proportionality factor K, standard deviation σ and covering rate of the toners of Examples 27 to 35 are different from those of the toners of Examples 6 to 9, 19 to 21, and 22 to 25. This is caused by the difference of the shape of the mother toner particles.

The toners of Examples 27 to 35 have a covering rate of not less than 8%, a proportionality factor K of not greater than 5 nN/um and a standard deviation σ of not greater than 0.65. Therefore they can produce good images.

On the contrary, the toners of Comparative Examples 8 to 10, which have a covering rate of not greater than 8%, a proportionality factor k of not less than 5 nN/tm, and a standard deviation σ of not less than 0.65, produce images having poor image qualities during the running test.

As can be understood from the above-description, by controlling the non-electrostatic adhesion force (which is not caused by the toner charge) between the toner and other elements the toner of the present, toner capable of producing images having high image qualities can be obtained. In addition, the toner of the present invention can be easily manufactured with out performing a severe classification operation, and therefore materials can be economically used.

This document claims priority and contains subject matter related to Japanese Patent Application No. 11-081627, filed on Mar. 25, 1999, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A toner for developing an electrostatic latent image on a photoreceptor, wherein said toner comprises particles having volume average particle diameter of 3 μm to 15 μm, and wherein the particles of the toner having particle diameters within a range of D±d and measured in μm, wherein d≦2 μm, have an average non-electrostatic adhesion force Fne (D) and measured in nN against the photoreceptor, and wherein a proportional factor K of a primary regression line of a diagram in which the toner particle diameter D is plotted on the horizontal axis and the non-electrostatic adhesion force Fne (D) is plotted on the vertical axis, is from 0.01 nN/μm to 5 nN/μm.

2. The toner according to claim 1, wherein a distribution curve of the non-electrostatic adhesion force of the particles of the toner in common logarithm scale has a standard deviation σ of not greater than 0.65.

3. The toner according to claim 1, wherein the toner particles comprise mother toner particles, and an external additive which is present on a surface of the mother toner particles and which has an average primary particle diameter of from 1 nm to 100 nm, and wherein the surface of mother toner particles is covered with the external additive in a covering rate of from 8% to 100%.

4. The toner according to claim 3, wherein the external additive has an average primary particle diameter of from 5 nm to 80 nm.

5. The toner according to claim 3, wherein the covering rate is from 10% to 90%.

6. The toner according to claim 3, wherein the external additive comprises a compound selected from the group consisting of silica, titania and alumina.

7. The toner according to claim 6, wherein the compound is subjected to a hydrophobic treatment.

8. The toner according to claim 3, wherein the external additive comprises a particulate acrylic polymer.

9. The toner according to claim 8, wherein the particulate acrylic polymer comprises at least one of polymethyl methacrylate and methyl methacrylate copolymer.

10. The toner according to claim 3, wherein the mother toner particles and the external additive are mixed with a Henshel mixer.

11. The toner according to claim 1, wherein the toner has a volume average particle diameter of from 3 μm to 10 μm.

12. The toner according to claim 3 wherein the mother toner particles comprise a binder resin, a colorant, a charge controlling agent and a releasing agent, and wherein the toner is prepared by mixing the binder resin, the colorant, the charge controlling agent and the releasing agent upon application of heat to form a mixture, cooling the mixture, subjecting the mixture to a pulverization treatment and a classification treatment to prepare the mother toner particles, and then mixing the mother toner particles with the external additive.

13. The toner according to claim 3, wherein the mother toner particles comprise a binder resin, a colorant, and a charge controlling agent, and wherein the toner is prepared by polymerizing a composition comprising one or more monomers which constitute the binder resin when polymerized, the colorant and the charge controlling agent to form mother toner particles, subjecting the mother toner particles to a classification treatment, and then mixing the classified mother toner particles with the external additive.

14. A one component developer for developing an electrostatic latent image on a photoreceptor, wherein said developer is in the form of particles, comprising mother toner particles having volume average particle diameter of 3 μm to 15 μm comprising a magnetic material, and an external additive, wherein the particles of the developer having particle diameters within a range of D±d and measured in μm, wherein d≦2 μm, have an average non-electrostatic adhesion force Fne (D) and measured in nN against the photoreceptor, and wherein a proportional factor K of a primary regression line of a diagram in which the developer particle diameter D is plotted on the horizontal axis and the non-electrostatic adhesion force Fne (D) is plotted on the vertical axis, is from 0.01 nN/μm to 5 nN/μm.

15. A two component developer for developing an electrostatic latent image on a photoreceptor, comprising a toner which comprises particles having volume average particle diameter of 3 μm to 15 μm, and a carrier, wherein the particles of the toner having particle diameters within a range of D±d and measured in μm, wherein d≦2 μm, have an average non-electrostatic adhesion force Fne (D) and measured in nN against the photoreceptor, and wherein a proportional factor K of a primary regression line of a diagram in which the toner particle diameter D is plotted on the horizontal axis and the non-electrostatic adhesion force Fne (D) is plotted on the vertical axis, is from 0.01 nN/μm to 5 nN/μm.

16. An image forming method comprising:
    forming an electrostatic latent image on a photoreceptor;
    developing the electrostatic latent image with a toner to form a toner image on the photoreceptor; and
    transferring the toner image onto a receiving material, wherein the toner comprises particles having volume average particle diameter of 3 μm to 15 μm, and wherein the particles of the toner having particle diameters within a range of D±d and measured in μm, wherein d≦2 μm, have an average non-electrostatic adhesion force Fne (D) and measured in nN against the photoreceptor, and wherein a proportional factor K of a primary regression line of a diagram in which the toner particle diameter D is plotted on the horizontal axis and the non-electrostatic adhesion force Fne (D) is plotted on the vertical axis, is from 0.01 nN/μm to 5 nN/μm.

17. An image forming apparatus comprising:
    an image bearing member;
    a latent image forming device which forms an electrostatic latent image on the image bearing member;

a developing device which develops the latent image with a toner; and a transferring device which transfers the toner image onto a receiving material, wherein the toner comprises particles having volume average particle diameter of 3 μm to 15 μm, and wherein the particles of the toner having particle diameters within a range of D±d and measured in μm, wherein d≦2 μm, have an average non-electrostatic adhesion force Fne (D) and measured in nN against the image bearing member, and wherein a proportional factor K of a primary regression line of a diagram in which the toner particle diameter D is plotted on the horizontal axis and the non-electrostatic adhesion force Fne (D) is plotted on the vertical axis, is from 0.01 nN/μm to 5 nN/μm.

18. The image forming apparatus according to claim 17, wherein the image bearing member comprises an inorganic photoreceptor.

19. The image forming apparatus according to claim 17, wherein the image bearing member comprises an organic photoreceptor comprising a charge generation layer, and a charge transporting layer.

* * * * *